United States Patent [19]

Nasyrov et al.

[11] 4,039,582
[45] Aug. 2, 1977

[54] METHOD OF PREPARING VANADIUM PENTOXIDE

[76] Inventors: Gakif Zakirovich Nasyrov, prospekt Mauki, 12 kv. 49; Izabella Vladislayovna Ravdonikas, ulitsa III Internatsionala, 14, kv. 58, both of Leningrad, USSR

[21] Appl. No.: 716,900

[22] Filed: Aug. 23, 1976

Related U.S. Application Data

[63] Continuation of Ser. No. 645,099, Dec. 29, 1975, abandoned, which is a continuation of Ser. No. 424,076, Dec. 12, 1973, abandoned.

[51] Int. Cl.$^2$ .............................................. C01G 31/00
[52] U.S. Cl. ..................................... 423/592; 423/65; 423/67; 423/593
[58] Field of Search ................................. 423/592, 593

[56] References Cited

U.S. PATENT DOCUMENTS

| 2,357,466 | 9/1944 | Frick | 423/592 |
| 3,087,786 | 4/1963 | Schoder | 423/592 |
| 3,472,612 | 10/1969 | Michel et al. | 423/592 |
| 3,728,442 | 4/1973 | Pakhomov | 423/592 |

FOREIGN PATENT DOCUMENTS

| 1,269,639 | 4/1972 | United Kingdom | 423/593 |

Primary Examiner—Herbert T. Carter

[57] ABSTRACT

The invention relates to methods of preparing vanadium pentoxide from a vanadium-containing solution, and more particularly, from a sodium vanadate solution. The method consists in that the solution is treated at a pH of 4 to 6 with ammonium chloride or sulphate to prepare an ammonium-vandate salt precipitate which is then dissolved in hot water, and recrystallized by a mineral acid. The new precipitate of the ammonium-vanadate salt is calcined to prepare vanadium pentoxide. The advantage of the proposed method is a highly increased degree of precipitation of the ammonium-vanadate salt from the solution of sodium vanadate and a corresponding decrease of vanadium loss with wastes to at least four times.

6 Claims, No Drawings

METHOD OF PREPARING VANADIUM PENTOXIDE

This is a continuation of application Ser. No. 645,099 filed Dec. 29, 1975 which in turn is a continuation of Ser. No. 424,076 filed Dec. 12, 1973, both of which are now abandoned.

BACKGROUND OF THE INVENTION

The invention relates to methods of preparing vanadium pentoxide from vanadium-containing solutions, and more particularly from a sodium vanadate solution.

The invention also relates to alumina production since solutions of sodium vanadate are obtained during processing of vanadium-containing sludge in the alumina production.

At the present time used widely are methods of preparing vanadium pentoxide from solutions of sodium vanadate obtained in the processing of vanadium-containing sludge in alumina production, of vanadium-containing titanium-magnetite ore, of phosphorite ore in the production of phosphorus, of carnotite ore in the production of uranium, etc.

Most widely used is the method of preparing vanadium pentoxide from solutions of sodium vanadate that are prepared from vanadium compounds in the corresponding processes, consisting in that solutions of sodium vanadate are processed with ammonium chloride or sulphate at lowered temperatures (20°–30° C) to precipitate an ammonium-vanadium salt, for example ammonium metavanadate, which is then dissolved in hot water and the obtained solution is processed at a lowered temperature with an ammonium solution. As a result of such processing, an ammonium-vanadate salt, for example ammonium metavanadate, is prepared. As the latter salt is calcined, vanadium pentoxide is prepared.

According to this method, the sodium vanadate solution is processed with the ammonium chloride or sulphate at a pH of 7 to 8.

A disadvantage inherent in this method is a rather high loss of vanadium with wastes due to incomplete precipitation of the ammonium-vanadate salt, in particular ammonium metavanadate, during procesing of the starting solution of sodium vanadate with the processing chloride or sulphate, and also during subsequent processing of the solution of ammonium-vanadate salt with the ammonium solution.

For example, the vanadium content of the waste solution is 1 – 2.5 g/liter, calculated as $V_2O_5$, and the vanadium content of the solution obtained by processing the ammonium-vanadate salt solution (in particular, ammonium metavanadate), with the ammonia solution, is as high as 3–5 g/liter (as $V_2O_5$).

Still another disadvantage of this method is the lengthy (10–20 hours) retention of the starting solution of sodium vanadate during its reaction with the ammonium chloride or sulphate which is necessary to attain the above mentioned residual concentrations of vanadium in the wastes.

One more disadvantage of this method is an insufficiently high concentration of vanadium in the solution that is formed by dissolution of the ammonium-vanadate salt in the hot water and processed with the ammonia solution at lowered temperatures. The vanadium content of this solution does not exceed (as experience shows) 40–50 g/liter, calculated with reference to $V_2O_5$, since it is limited by the decreasing solubility of the ammonium-vanadate salt, in particular ammonium metavanadate, in water.

The insufficiently high vanadium content of the solution which is decomposed to precipitate vanadium compounds by this or that method is detrimental to the kinetics of the process of isolating vanadium compounds from the solution and precipitation, and requires lengthy retention of the solution of the ammonium-vanadate salt during its processing with the ammonia solution to precipitate the ammonium-vanadate salt. Practical experience has shown that in order to attain the residual content of vanadium of 3–5 per liter (as $V_2O_5$) in the ammonium-vanadate salt solution, (in particular, ammonium metavanadate) after its treatment with the ammonia solution at a lowered temperature, the solution should be kept under the required conditions for 10–20 hours. This, in turn, increases the duration of the entire process for preparing vanadium pentoxide.

Moreover, the insufficient vanadium content of the solution which is formed by the dissolution of the ammonium-vanadate salt in the hot water, increased flow rates in the process cycle during further processing of the solutions to isolate vanadium pentoxide. This, in turn, increases energy consumption (heating, cooling, pumping, etc.) and volumes of solutions handled.

A disadvantage of this method lies also with an increased energy consumption for cooling the ammonium-vanadate solution during its processing the ammonia solution to precipitate the ammonium-vanadate salt.

Still another disadvantage of the method is the necessity to recover large amounts of ammonia from the waste gases which are formed during calcining the ammonium-vanadate salt, in particular, ammonium metavanadate, to prepare vanadium pentoxide. The quantity of ammonia (as $NH_3$) that is liberarted per kg of the obtained vanadium pentoxide with the waste gases is 0.187 kg.

The most advantageous method of preparing vanadium pentoxide from solutions of sodium vanadate formed from various vanadium compounds in the corresponding branches of industry, is one consisting in that solutions of sodium vanadate are processed with ammonium chloride or sulphate at lowered temperatures to precipitate ammonium-vanadate salt, in particular, an ammonium metavanadate, which is then dissolved in hot water and the obtained solution of the ammonium vanadate salt is processed, at an elevated temperature with a mineral acid. As a result, a substance containing vanadium, in particular, ammonium polyvanadate is precipitated, which is then calcined to prepare vanadium pentoxide.

The solution of sodium vanadate is processed at a pH of 7 to 8.

This method is characterized by the same disadvantages that are inherent in the widely used method described beforehand, except the high energy consumption and the necessity to recover a large quantity of ammonia.

In the latter method, the solution of the ammonium-vanadate salt, in particular, ammonium metavanadate, is processed with a mineral acid at an elevated temperature. The operation of cooling the ammonium vanadate solution in this method is omitted; hence decreased energy consumption.

In the latter method, the quantity of ammonia in the waste gases of the calcining step decreases. For example, the amount of ammonia during preparation of vanadium pentoxide by calcining the ammonium polyvanadate precipitate is as low as 0.062 kg per kg of the obtained vanadium pentoxide.

SUMMARY OF THE INVENTION

The object of the invention is to remove the above disadvantages in the known methods of preparing vanadium pentoxide from solutions of sodium vanadate that are formed from vanadium-containing compounds prepared by various processes, in particular, in the production of alumina.

The specific object of the invention is to work out a method characterized by optimum conditions for precipitation of an ammonium-vanadate salt during processing a sodium vanadate solution with an ammonium chloride or ammonium sulphate solution and for subsequent conversion of the ammonium-vanadate salt into solution.

The object of the invention is to work out a method of preparing vanadium pentoxide from solutions of sodium vanadate which provides optimum conditions for precipitation of an ammonium-vanadate salt during processing the sodium vanadate solution with ammonium chloride or ammonium sulphate, and for subsequent conversion of the ammonium-vanadate salt into solution.

Practical objects of the invention are to decrease vanadium loss with wastes due to intensified precipitation of the ammonium-vanadate salt, in particular ammonium-sodium decavanadate, from the starting solution of sodium vanadate and during further recrystallization of the ammonium vanadate-salt; to decrease the duration of the entire process by reducing the retention time of the starting solution of sodium vanadate during its reaction with the ammonium chloride or ammonium sulphate; to decrease the specific rates of liquid flows in the process cycle; and to decrease energy consumption and other expenditures.

Other objects and advantages of the proposed invention will become subsequently clear from the detailed description which follows.

The objects of the invention have been fulfilled in that during preparation of vanadium pentoxide from a sodium vanadate solution by processing it with ammonium sulphate or ammonium chloride at lowered temperatures to precipitate an ammonium-vanadate salt with subsequent dissolution of the salt in hot water, processing of the obtained solution with a mineral acid at an elevated temperature, separation of the formed precipitate and its calcining to prepare vanadium pentoxide, according to the invention the starting solution of sodium vanadate is processed at a pH from 4 to 6. This improves the conditions for precipitation of the ammonium-vanadate salt and decreases the vanadium content of waste solutions to less than 1 g/liter, practically 0.1–0.5 g/liter, calculated as $V_2O_5$ and also increases the concentration of the ammonium vanadate salt in the solution, which is then processed with a mineral acid at an elevated temperature, to 70–100 g/liter calculated as $V_2O_5$.

DETAILED DESCRIPTION OF PREFERRED EMBODIMENTS

For a better understanding of the invention, it will be illustrated by a detailed description of practical examples of its embodiment.

The method is applicable for preparing vanadium pentoxide from any solutions of sodium vanadate that are obtained from various vanadium-containing compounds in processing vanadium-containing sludges in the manufacture of alumina, vanadium-containing titanium-magnetite ores, in the manufacture of phosphorus, carnotite ores in the manufacture of uranium, etc. These are any solutions of sodium vanadate that would be usually used in the manufacture of vanadium pentoxide, taken at the stage when they are purified from admixtures of phosphorus, aluminium, fluorine, iron, calcium, etc., to the degree of purity to which these solutions are purified from the above named admixtures in the known method of preparing vanadium pentoxide of a certain degree of purity, depending on the grade of the produced vanadium pentoxide.

Such solutions are known to contain sodium vanadate in the quantity of 10–30 g/liter calculated as $V_2O_5$, and have weakly acid, neutral or alkaline reactions.

The quantity of phosphorus compounds in a solution of sodium vanadate can be to 2–5 g/liter, calculated as phosphorus pentoxide.

The quantities of the other admixtures, such as fluorine, iron, calcium, etc., can be tenth fractions of a gram per liter.

Solutions of sodium vanadate that are obtained from vanadium sludge of the alumina production often contain considerable quantities of sodium sulphate (100 g/liter and over, calculated as $SO_3$).

Solutions of sodium vanadate containing admixtures of reducing agents that are capable of reducing ions of pentavalent vanadium in an aqueous solution at temperatures from 20° to 70° C and a pH from 4 to 6 to vanadium of a lower valency, for example to its tetravalent or tervalent states, should be first oxidized.

Vanadium pentoxide is prepared by processing a sodium vanadate solution with an ammonium chloride or ammonium sulphate solution at lowered (20°–30° C) temperatures and a pH of 4 to 6 to precipitate an ammonium-vanadate salt, ammonium-sodium decavanadate, by separating the thus-formed precipitate from the solution, dissolving the precipitate in hot water to prepare a solution of the ammonium-vanadate salt, processing the obtained hot solution with a solution of a mineral acid with subsequent separation of the formed precipitate and is calcining to prepare vanadium pentoxide.

The solution of sodium vanadate should preferably be processed with the ammonium sulphate or ammonium chloride at a pH of 4.4 to 4.8. Under these conditions a maximum amount of vanadium is transferred from the solution into the precipitate of the ammonium-vanadate salt. The yield is 95–99.9 percent with respect to the initial vanadium content of the starting sodium vanadate solution.

The solution of sodium vanadate should preferably be processed with the ammonium chloride or ammonium sulphate at a temperature not above 40° C. At lower temperatures (below 20° C) the efficiency of vanadium precipitation from solution is not improved, but the crystallization kinetics of the ammonium-vanadate salt, ammonium-sodium decavanadate, is slowed down and the crystals are too fine. Moreover, the starting solutions of sodium vanadate, as a rule have a temperature of 50°–95° C and are cooled during processing with the ammonium chloride or ammonium sulphate. In this case, cooling the solutions to a temperature below 20° C involves additional expenditures of energy. At a temperature above 40° C the solubility of the ammonium-vanadium salt, ammonium-sodium decavanadate) increases sharply, and the efficiency of precipitation of vanadium from solution decreases as a result. Moreover, at a temperature above 40° C some vanadium can precipitate from solution in the form of polyvanadates insoluble in water, which complicates further processing of the ammonium-vanadate salt into vanadium pentoxide.

Ammonium chloride or ammonium sulphate can be used to process the sodium vanadate solution both in the form of a solid salt, and in the form of a solution, or pulp prepared by dissolving solid ammonium sulphate or ammonium chloride in water or in return process solutions.

The sulphate or chloride of ammonia is taken in excess, compared with theoretically required quantities. The required quantities of the ammonium-containing agents do not exceed those of the ammonium-containing agents used in the known methods of preparing vanadium pentoxide from solutions of sodium vanadate. The quantities of the ammonium or sulphate per gram of vanadium pentoxide in the starting solution of sodium vanadate does not exceed 0.84 g, and is most often 0.5 – 0.6 g (calculated as $NH_4$).

It is recommendable to add the required quantity of the sulphate or chloride of ammonium at the beginning of the operation, when the solution of sodium vanadate is not yet cooled.

The solution of sodium vanadate should preferably be processed with the ammonium sulphate or chloride at a pH of 4 to 6 at a temperature not above 40° C, preferably for 2 to 6 hours. If the solution is processed for less than 2 hours, the precipitation of the ammonium-vanadate salt (ammonium-sodium decavanadate) from the solution is incomplete. Processing for periods longer than 6 hours does not improve the efficiency of vanadium precipitation from the solution.

The precipitate of the ammonium-vanadate salt, ammonium-sodium decavanadate, formed by processing the sodium vanadate solution with the ammonium sulphate or ammonium chloride, is separated from the solution by settling, with subsequent filtration or centrifuging, or by any other known technique.

The waste solution of this process contains mainly sodium sulphate or sodium chloride, and also unreacted ammonium sulphate or ammonium chloride respectively. Quantities of sodium sulphate in the waste solution during preparing vanadium pentoxide from the sodium vanadate solution formed by processing vanadium sludge in the alumina production can be as high as at least 200 g/liter (calculated as $Na_2SO_4$).

Moreover, waste materials contain vanadium in the quantity to 1 g/liter (more often 0.1 – 0.5 g/liter) calculated as $V_2O_5$, and also small quantities of compounds of phosphorus, fluorine, calcium, and others, that are present in the starting solution of sodium vanadate.

The obtained precipitate consists of 95–99.5 percent of ammonium-sodium decavanadate having an approximate chemical formula $(Na_2(NH_4)_4 \cdot V_{10}O_{28} \cdot 11H_2O$. Ammonium-sodium decavanadate is more soluble in hot water than ammonium metavanadate isolated from solutions of sodium vanadate at a pH of 7 to 8 by the known methods of preparing vanadium pentoxide from solutions of sodium vanadate. This makes it possible to attain a high concentration of vanadium in the aqueous solution of the ammonium-vanadate salt formed during processing the sodium-vanadate solution with the ammonium sulphate or ammonium chloride at a temperature not above 40° C and a pH of 4 to 6.

The precipitate of the ammonium-vanadate salt, ammonium-sodium decavanadate, is dissolved in hot water to prepare a solution containing vanadium in the quantity of 70–100 g/liter calculated as $V_2O_5$. This solution can be given an additional filtration to remove insignificant quantities of suspended solids, whenever vanadium pentoxide of a high purity is required.

The solution of the ammonium-vanadate salt, ammonium-sodium decavanadate, is then processed with any mineral acid, for example hydrochloride, or sulphuric acid at a temperature of 90°–100° C. The pH of the medium during processing with the mineral acids is 2.0 to 5.5. The value of the pH of the ammonium-vanadate salt solution, ammonium-sodium decavanadate solution, during processing it with a mineral acid may be selected within a range wider than that specified above. At a pH higher than 5.5 the conversion of vanadium from the solution into the precipitate is somewhat lowered, and at a pH less than 2 the formed precipitate can contain admixtures of alkaline metals; the degree of conversion of vanadium into the precipitate is not lower than 95–99.9 percent with respect to the ammonium-vanadate salt (ammonium-sodium decavandate) content of the solution.

The solution of the ammonium-vanadate salt (ammonium-sodium decavanadate) is processed with a mineral acid at a pH of 2.0 to 5.5 and a temperature of 90°–100° C for 0.3 to 2 hours. In most cases the duration of the processing sufficient to attain the residual concentration of vanadium in the solution of 0.05 – 0.5 g/l (as $V_2O_5$) is 20 to 60 minutes.

The formed precipitate is separated from the solution by filtration, centrifuging or by any other known method.

The obtained solution contains mainly sodium sulphate or sodium chloride, and also ammonium sulphate or ammonium chloride, depending on what particular mineral acid is used to process the solution of the ammonium-vanadate salt. For example, if the solution of the ammonium-vanadate salt is processed with sulphuric acid, the above mentioned solution contains mainly sodium sulphate in the quantity of about 10–20 g/liter, calculated as $Na_2SO_4$, and ammonium sulphate in the quantity of 3–7 g/liter, calculated as $(NH_4)_2SO_4$.

The precipitate obtained by processing the ammonium-vanadate salt solution, ammonium-sodium decavanadate solution, with a mineral acid at an elevated temperature, consists of 95–99.9 percent of ammonium polyvanadate having, for example, the chemical formula $(NH_4)_4(VO_2)_2V_{10}O_{28}$. This precipitate is calcined at a temperature of 450°–550° C to prepare vanadium pentoxide.

All precipitates isolated from the solutions are well settled and have good filtering properties.

EXAMPLE 1

Vanadium pentoxide was prepared from a solution of sodium vanadate formed during processing vanadium sludge in an alumina production. The vanadium sludge was obtained during processing high-silicon bauxite of the hydrargillite type containing $SiO_2$ 8.4 percent, and $Al_2O_3$ 45.9 percent.

The vanadium sludge had the following chemical composition expressed in percent:

|  |  |
|---|---|
| $V_2O_5$ | 21.3 |
| $P_2O_5$ | 10.8 |
| $Na_2O$ | 39.4 |
| $K_2O$ | 0.1 |
| $Al_2O_3$ | 0.3 |
| $SO_3$ | 0.07 |
| F | 1.9 |
| $H_2O$ | 25.7 |
| others | to 100% |

A sodium vanadate solution was prepared from this sludge. The content of the basic components in the solution was as follows (in g per liter):

|  |  |
|---|---|
| $V_2O_5$ | 30.0 |
| $Na_2O$ | 55.5 |
| $SO_3$ | 57.5 |
| $P_2O_5$ | 1.2 |

The starting solution of sodium vanadate had a temperature of 90° C and a pH = 7.2.

Ammonium sulphate $(NH_4)_2SO_4$, in a quantity of 60 g per liter of the sodium vanadate solution, was added and the solution was gradually cooled to 25° C. When the temperature of the solution was 40° C, the pH of the medium was corrected by gradually adding sulphuric acid to adjust the pH to 5.5, which was maintained till the end of the process of precipitation of an ammonium-vanadate salt by adding sulphuric acid to the solution. The sodium vanadate solution was processed with ammonium sulphate at a pH of 5.5 and a temperature of 25° C for 4 hours.

The formed precipitate was separated from the solution by filtration and washed on a filter with cold water taken in a quantity of 0.2 kg per kg of the precipitate.

The obtained precipitate of the ammonium-vanadate salt was then dried in air and had the following composition in percent:

|  |  |
|---|---|
| $V_2O_5$ | 70.80 |
| N | 4.50 |
| $Na_2O$ | 5. |
| water of crystallization | 15.8 |

According to its chemical composition the air-dried precipitate closely corresponds to the chemical formula of ammonium-sodium decavanadate $Na_2(NH_4)_4.V_{10}O_{28}.11H_2O$. The precipitate has a fine crystalline structure, the color of crystals being golden yellow.

The solution prepared after filtration of the ammonium-vanadate salt had the following composition with respect to its main components, in g per liter:

| $V_2O_5$ | 0.45 | $SO_3$ | 95.5 |
|---|---|---|---|
| $Na_2O$ | 53.5 | $NH_4$ | 13.8 |

The ammonium-vanadate (ammonium-sodium decavanadate) salt precipitate was dissolved in water at a temperature of 95° C. The concentration of the solution was 90 g/liter (as $V_2O_5$). The solution was then given another filtration after which it was processed with sulphuric acid at a temperature of 95° C with mechanical stirring until the pH was 4.0. This pH was then maintained till the end of the process.

The acid treatment of the ammonium-vanadate (ammonium-sodium decavanadate) solution at the temperature of 95° C was continued for 1 hour, after which the formed precipitate was separated by filtration.

The obtained precipitate was washed two times with hot water by the re-pulpation method, at a liquid-to-solid ratio at the moment of re-pulpation of 3, with subsequent filtration of the precipitate after each re-pulpation and spraying it on a filter with hot water taken in a quantity of 1 kg per kg of the obtained precipitate.

Vanadium pentoxide content of the obtained precipitate after drying in air was 90.9 percent calculated as $V_2O_5$. The loss of weight during calcining at 500° C was 8.92 percent. The air-dry precipitate had its chemical composition similar to that of ammonium polyvanadate: $(NH_4)_4(VO_2)_2V_{10}O_{28}$.

The remaining solution (after separation of ammonium polyvanadate) had the following composition with respect to its main components, in g/liter.

| $V_2O_5$ | 0.1 | $SO_3$ | 13.4 |
|---|---|---|---|
| $Na_2O$ | 6.3 | $NH_4$ | 1.3 |

The precipitate of ammonium polyvanadate obtained by processing the solution of the ammonium-vanadate salt (ammonium-sodium decavanadate) with sulphuric acid at a temperature of 95° C was then calcined at a temperature of 500° C for 3 hours.

The calcined material contained 99.8 percent of $V_2O_5$.

EXAMPLE 2

Vanadium pentoxide was prepared from a sodium vanadate solution obtained during processing vanadium sludge in an alumina production. The vanadium sludge was obtained during mutual processing into alumina of the hydrargillite type namely:

bauxite containing 5.3 percent of $SiO_2$ and 46.8 percent of $Al_2O_3$, and bauxite containing 3.7 percent of $SiO_2$ and 56.2 percent of $Al_2O_3$.

The vanadium sludge had the following chemical composition, expressed in percent:

| $V_2O_5$ | 15.1 | $Al_2O_3$ | 2.7 |
|---|---|---|---|
| $P_2O_5$ | 8.5 | F | 2.9 |
| $Na_2O$ | 2.7 | $H_2O$ | 25.0 |
| others to 100 per cent. | | | |

A sodium vanadate solution was prepared from this sludge. The content of the main components in the solution expressed in g/liter was as follows:

| $V_2O_5$ | 35.0 | $SO_3$ | 102.1 |
|---|---|---|---|
| $Na_2O$ | 92.4 | $P_2O_5$ | 0.2 |

The temperature of the starting solution of sodium vanadate was 95° C, the pH 7.5.

Ammonium chloride $NH_4Cl$ taken in a quantity of 84 g per liter of the sodium vanadate solution was added with stirring and the solution was gradually cooled to 30° C. As soon as the temperature of the solution was 30° C the pH was adjusted by gradually adding hydrochloric acid until the pH was 4.0 which was then maintained at this level till the end of the process of precipitation of the ammonium-vanadate salt by adding hydrochloric acid to the solution.

The solution of sodium vanadate was processed with ammonium chloride for 5 hours at a temperature of 30° C and a pH of 4.0.

The formed precipitate was separated by filtration and washed on a filter with cold water taken in a quantity of 0.2 kg per kg of the precipitate.

The obtained precipitate of the ammonium-vanadate salt after drying in air had the following chemical composition, expressed in percent:

| | |
|---|---|
| $V_2O_5$ | 70.6 |
| N | 4.35 |
| $Na_2O$ | 4.40 |
| Water of crystallization | 15.40 |

The solution obtained after separation of the ammonium-vanadate salt (ammonium-sodium decavanadate) had the following composition with respect to the main components, in g/liter:

| | | | | | |
|---|---|---|---|---|---|
| $V_2O_5$ | 0.2 | Cl | 55.0 | $SO_3$ | 55.0 |
| $Na_2O$ | 90.0 | $NH_4$ | 25.1 | | |

The precipitate of the ammonium-vanadate salt (ammonium-sodium decavanadate) was dissolved in water at a temperature of 90° C. The concentration of the solution was 85 g/liter, calculating with reference to $V_2O_5$. The solution was then given another filtration and processed as described in Example 1. The solution of the ammonium-vanadate salt was processed with hydrochloric acid at a temperature of 90° C.

The precipitate of ammonium polyvanadate prepared by processing the solution of the ammonium-vanadate salt (ammonium-sodium decavanadate) with the hydrochloric acid at a temperature of 90° C was then calcined at a temperature of 500° C for 3 hours. The calcined material contained 99.2 percent of $V_2O_5$.

EXAMPLE 3

Vanadium pentoxide was prepared from a solution of sodium vanadate formed in processing vanadium sludge in an alumina production. The vanadium sludge was prepared by processing into alumina an alunite ore consisting of 50 percent of gangue and 50 percent of alunite mineral having the chemical formula $(K, Na)_2SO_4 \cdot Al_2(SO_4)_3 \cdot 2Al_2O_3 \cdot 6H_2O$. The vanadium sludge had the following chemical composition, expressed in percent:

| | | | |
|---|---|---|---|
| $V_2O_5$ | 9.4 | $Al_2O_3$ | 0.2 |
| $P_2O_5$ | 24.6 | $SO_3$ | 0.2 |
| $Na_2O$ | 41.8 | F | 0.5 |
| $K_2O$ | 0.1 | $H_2O$ | 22.9 |
| others to 100 per cent | | | |

The vanadium sludge was processed into a solution of sodium vanadate containing the main components, in g/liter:

| | | | |
|---|---|---|---|
| $V_2O_5$ | 15.0 | $SO_3$ | 79.0 |
| $Na_2O$ | 67.0 | $P_2O_5$ | 0.7 |

The temperature of the starting sodium vanadate solution was 95° C, the pH 7.4.

Ammonium sulphate $(NH_4)_2SO_4$ was added to the sodium vanadate solution with stirring in a quantity of 33 g per liter and the solution was then gradually cooled to 20° C. At a temperature of 40° C, the pH was corrected by adding gradually sulphuric acid until the pH was 4.6, and this pH was then maintained till the end of the process of precipitating an ammonium-vanadate salt by adding sulphuric acid. The sodium vanadate solution was processed at a pH of 4.6 and a temperature of 20° C for 3 hours.

The formed precipitate was separated on a filter, washed with cold water taken in a quantity of 0.2 kg per kg of the precipitate.

The obtained precipitate of the ammonium-vanadate salt was air-dried and had the following composition, expressed in percent:

| | | | |
|---|---|---|---|
| $V_2O_5$ | 71.2 | $Na_2O$ | 5.0 |
| N | 4.4 | $H_2O$ of crystallization | 15.7 |

The solution remaining after separation of the precipitate (ammonium-sodium decavanadate) had the following composition with respect to the main components, in g/liter:

| | | | |
|---|---|---|---|
| $V_2O_5$ | 0.3 | $SO_3$ | 99.8 |
| $Na_2O$ | 65.9 | $NH_4$ | 7.7 |

The precipitate of the ammonium-vanadate salt (ammonium-sodium) decavanadate) was dissolved in water at a temperature of 90° C. The concentration of the obtained solution was 85 g/liter, calculated with reference to $V_2O_5$.

The obtained solution was then processed as described in Examples 1 and 2.

The precipitate of ammonium polyvanadate obtained after processing the ammonium-vanadate salt (ammonium-sodium decavanadate) with sulphuric acid was calcined at a temperature of 500° C for 2 hours. The calcined material contained 99.8 percent of $V_2O_5$.

We claim:

1. A method of preparing vanadium pentoxide comprising the steps of: processing a solution of sodium vanadate at a pH of from 4 to 6 with at least one substance selected from the group consisting of ammonium chloride and ammonium sulphate at a temperature of from 20° to 40° C to precipitate ammonium-sodium decavanadate, the substance being present in an amount not exceeding 0.84 gram, calculated as $NH_4$, per gram of vanadium pentoxide in the solution of sodium vanadate; dissolving the ammonium-sodium decavanadate in hot water to prepare a solution of the ammonium-sodium decavanadate with a concentration of from 70 to 100 grams/liter of vanadium pentoxide; processing the obtained solution of ammonium-sodium decavanadate with a mineral acid to precipitate ammonium polyvanadate; and calcining the ammonium polyvanadate to prepare vanadium pentoxide.

2. The method as claimed in claim 1, wherein the solution of sodium vanadate is processed with the substance selected from the group consisting of ammonium chloride and ammonium sulphate at a pH of from 4.4 to 4.8.

3. The method as claimed in claim 1, wherein the substance selected from the group consisting of ammonium chloride and ammonium sulphate is present in an amount of from 0.5 to 0.6 gram, calculated as $NH_4$, per gram of vanadium pentoxide in the solution of sodium vanadate.

4. The method as claimed in claim 1, further comprising the step of filtering the solution of ammonium-sodium decavanadate prior to processing the solution of ammonium-sodium decavanadate with the mineral acid.

5. The method as claimed in claim 1, wherein the solution of ammonium-sodium decavanadate is processed with the mineral acid at a temperature of from 90° to 100° C. and a pH of from 2 to 5.5.

6. The method as claimed in claim 5, wherein the solution of ammonium-sodium decavanadate is processed with the mineral acid for a period of from 0.3 to 2 hours.

* * * * *